United States Patent
Evels et al.

[11] Patent Number: 6,089,427
[45] Date of Patent: Jul. 18, 2000

[54] SUSTAINER

[75] Inventors: Brigette Evels, Wuppertal; Marcus Drees, Bremen, both of Germany

[73] Assignee: JAC Products Deutschland GmbG, Wuppertal, Germany

[21] Appl. No.: 09/327,910

[22] Filed: Jun. 8, 1999

[30] Foreign Application Priority Data

Jul. 22, 1998 [DE] Germany ............................. 198 32 922

[51] Int. Cl.⁷ ........................................................ B60R 9/04
[52] U.S. Cl. ............................................ 224/309; 224/322
[58] Field of Search .................................. 224/309, 322, 224/325, 326

[56] References Cited

U.S. PATENT DOCUMENTS 5,573,159  11/1996  Fisch et al. .............................. 224/309
5,617,981   4/1997  Ricker et al. ............................ 224/309

FOREIGN PATENT DOCUMENTS

| 31 23 106 A1 | 12/1981 | Germany . |
| 42 23 898 A1 | 1/1994 | Germany . |
| 44 18 528 C1 | 6/1995 | Germany . |
| 580023A | 9/1995 | Germany . |

*Primary Examiner*—Linda J. Sholl
*Attorney, Agent, or Firm*—Harness, Dickey & Pierce, PLC

[57] ABSTRACT

A sustainer for a roof rail which can be placed on a vehicle will be described. The sustainer includes a hollow sustaining body (1) with a floor plate (3). The floor plate (3) is engaged by a base (6) which is fastened to the floor plate (3) by a fastener (14), whereby the fastener (14) locally lies on the floor plate (3) and locally engages the base (6). They are held together by a threaded bolt (16) pulling the fastener (14) onto the inner surface of the floor plate (3).

19 Claims, 2 Drawing Sheets

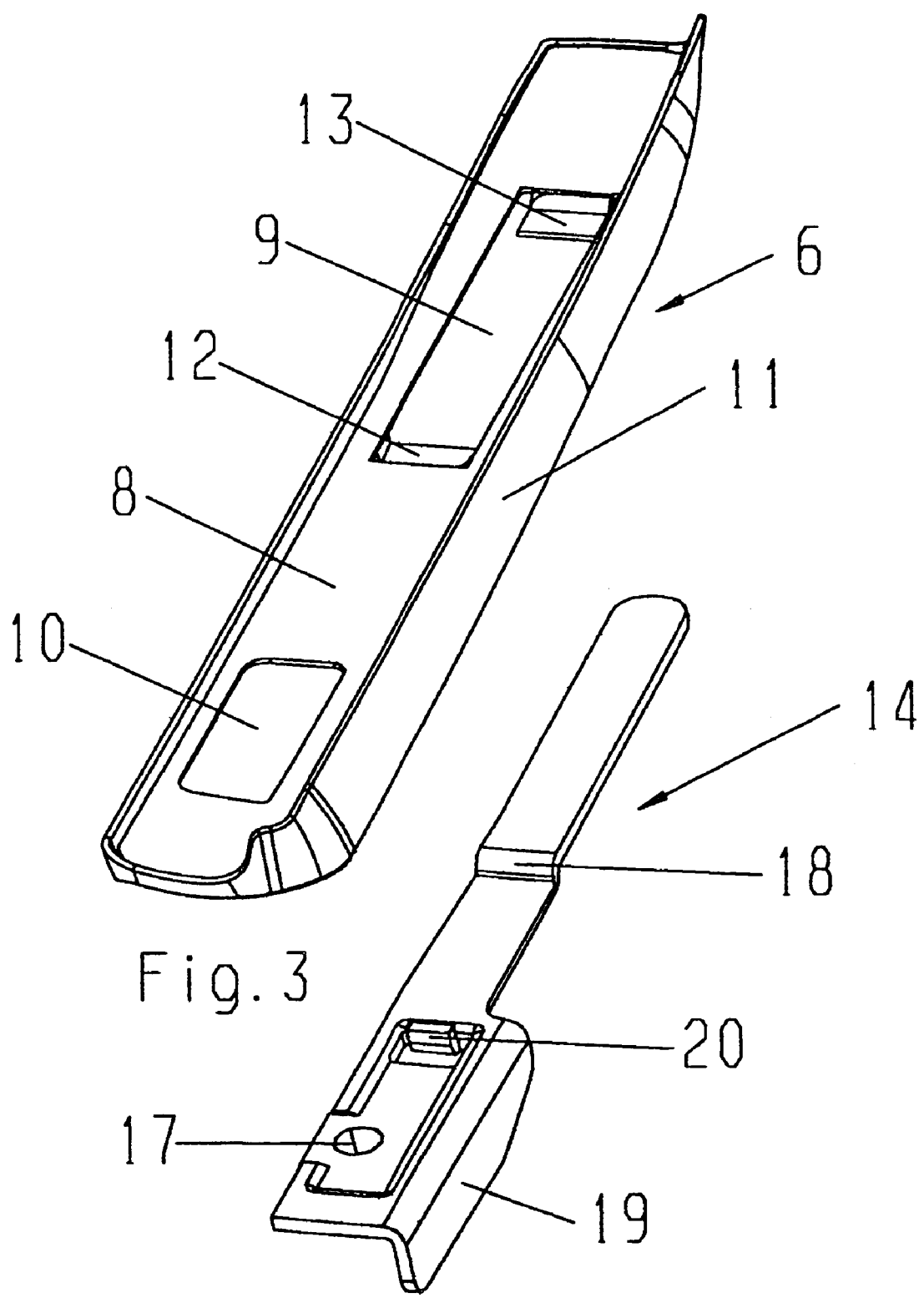

SUSTAINER

TECHNICAL FIELD

The invention relates to a sustainer for a roof rail which can be placed on a motor vehicle.

BACKGROUND OF THE INVENTION

DE 42 23 898 A1 shows a roof rail which consists of a boom with sustainers sitting on its ends. Each sustainer consists of a hollow sustaining body with a floor plate which is arranged on a receiving unit fastened within a hollow of the sustaining body. An insert is seated within a breach of the floor plate. The insert has bore provided with an internal thread which fastens the rail to a threaded bolt provided on the vehicle's roof.

DE 31 23 106 shows a base for the sustainer of a roof rail which can be placed on a motor vehicle. The base consists of a gasket sheet, a pressure plate arranged over it, and a collar which directly abuts the sustainer and engages the pressure plate. These each have a passageway for a fastening bolt arranged on the rail's foot. The gasket sheet, pressure plate, and collar are also fastened to each other by fastening means. Thus, a glued joint can be provided between the gasket sheet and pressure plate, and a plug-type connector between the pressure plate and collar. A threaded bolt can be provided for preassembling the entire multiple-piece base on the sustainer. This bolt goes through a bore of the gasket sheet which has a smaller diameter than the bolt. But the threaded bolt requires a recess with an internal thread within the sustainer, so that the sustainer must be sturdily built or be equipped with an inserted part depicted in DE 42 23 898 A1 which must be manufactured separately and fastened to the sustainer.

The objective of the present invention is to provide a sustainer, equipped ready for assembly with base and threaded bolt, which is simple and economical to manufacture, and in which the base is supported in the proper position and safe for moving without expensive gluing or the like.

To solve the problem in accordance with the invention, a sustainer for a roof rail arranged on a motor vehicle is provided with a hollow sustaining body, a floor plate designed on the sustaining body, a base abutting the floor plate, and a fastener locally engaging underneath the base. The floor plate has a first opening for locally inserting the fastener into the hollow space of the sustaining body and a second opening for tightly engaging a compensating element like a supporting dome at one end. A female thread is designed or arranged on the fastener into which a threaded bolt, going through and supporting itself on the compensating element, can be screwed. By screwing the bolt into the thread, the threaded end of the fastener can be pulled toward the inside of the floor plate and the other end, which is offset step-by-step, can be pulled toward the outside of the floor plate with a base area included.

The sustainer in accordance with the invention is a single-piece materially-uniform component of metal or possibly of plastic, and contains a hollow sustaining body with a floor plate designed on it. The base can be fastened on the sustainer and the sustainer can be fastened to the vehicle's roof by only a single fastener which cooperates with one threaded bolt.

It is appropriate for the fastener to consist of a sheet metal strip, which has a step-shaped offset, approximately as thick as the floor plate, approximately in the middle and which, at one end, is provided with a female thread that is designed as an extruded hole or that consists of a weld nut or stamped nut. Such a fastener is understandably very easy and inexpensive to manufacture.

In accordance with one development of the invention, the fastener can have a bent material tab on the threaded end. This measure mainly serves to increase the fastener's firmness and stiffness.

A further development of the invention provides for the fastener to have a free punched positioning catch bent downwards. This makes it easier to position the fastener, especially in consideration of reliably meeting the female thread.

In accordance with another development of the invention, the base may have an oblong recess which is at least as wide as the width of the fastener, is bridged by a web at one longitudinal end, and is limited at its other longitudinal end by a free punched, doubly bent, tongue that the fastener can engage. The bridging of the web allows the fastener to pass through easily and guarantees that the base will press tightly-sealed against the sustainer in cooperation with the tongue that engages the fastener from below.

The base can be fashioned of a rubber or plastic material, but also of a combination of these materials if necessary. A combination can be preferable, for example, if the base has a surrounding collar nestling itself against the sustainer's wall in accordance with a further development of the invention.

A particularly preferable further development of the invention consists in that the sustaining body with floor plate consists of one high-pressure molded part. In this case, it can furthermore be particularly advantageous for the sustaining body to be designed as a single-piece with a second sustaining body shaped as its mirror-image and connected across a railing boom. The scope of the invention also provides that a plastic roof rail may be used, consisting of one sustainer or two sustainers and one boom connecting these together single-pieced and materially-uniform, whereby the sustainer or the roof rail can be manufactured as plastic injection molded parts using the gas-filled internal pressure process.

BRIEF DESCRIPTION OF THE DRAWINGS

The various advantages of the present invention will become apparent to one skilled in the art by reading the following specification and subjoined claims and by referencing the following drawings in which:

Figure 1:
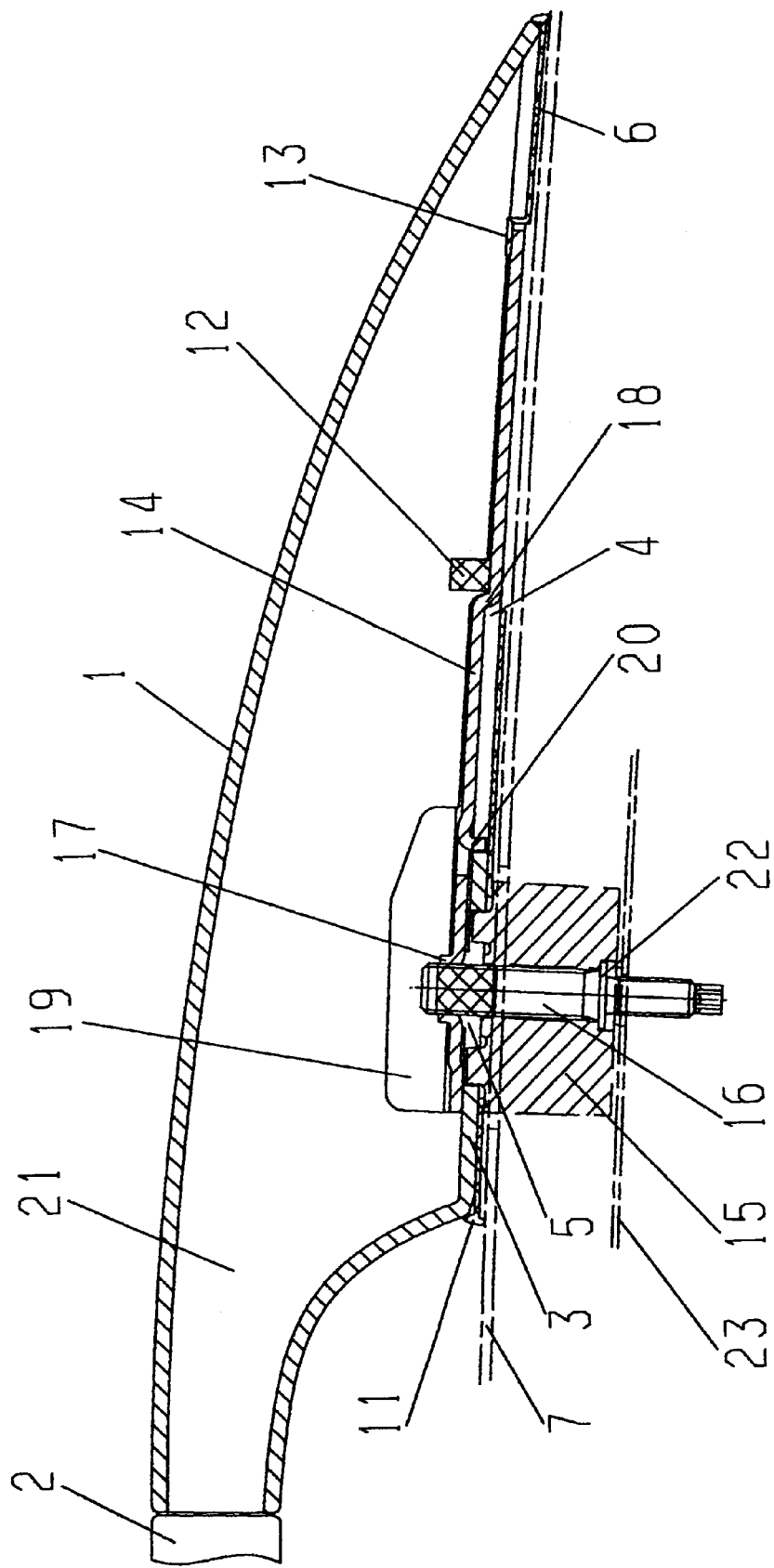
FIG. 1 a vertical longitudinal section through a sustainer of the present invention including a base and a fastener, FIG. 2 a graphical view of the fastener according to FIG. 1 and FIG. 3 a graphical view of the base according to FIG. 1.

The sustainer consists of a hollow sustaining body 1, to which a boom 2, designed either as a separate or a single piece with sustaining body 1, attaches. The other end of the boom, not illustrated, connects to a second sustainer, also not shown, which is a mirror image of that shown in FIG. 1. The sustaining body has a single-pieced floor plate 3 which has a first opening 4 and a second opening 5.

The sustaining body 1 is engaged underneath by a base 6 which can consist of rubber or plastic or a combination of these materials. The base 6 prevents direct contact between the sustainer and the vehicle's roof 7. The base 6 also serves as a sealing unit and compensates for tolerances.

The base 6 has a floor 8 with a first oblong opening 9 and a second noncircular opening 10. Base 6 is also equipped with a surrounding collar 11 nestled against both the wall of the sustaining body 1 and the roof 7. The first opening 9 of the base 6 is bridged by a raised web 12 on one end and is bounded by a free punched and doubly bent tongue 13 at the other longitudinal end.

The base 6 is held to the sustaining body 1 by a fastener 14 which cooperates with a threaded bolt 16 and a compensating element, such as a supporting dome 15. The fastener 14 suitably consists of a sheet metal part with an oblong strip-like design. A bore, to which a female thread 17 is assigned, or which may include a stamped nut for example, is designed in the fastener 14 near its end. The female thread 17 is for receiving one end of the threaded bolt 16.

The fastener 14 has a step-shaped offset 18 approximately in its middle. The offset's height approximately equals the thickness of the floor plate 3. The fastener 14 also has a bent material tab 19, primarily for bracing, and a free punched positioning catch 20 bent downwards.

To assemble the sustainer with the base 6, the fastener 14 is first pushed into the first opening 4 of the floor plate 3 and into the hollow space 21 of the sustaining body 1, so that the female thread 17 arrives at the second opening 5 of the floor plate 3. With the web 12 in front, the base 6 is shoved so far across the part of the fastener 14, which is on the right in FIG. 2, until the open end of the fastener 14 engages the tongue 13 of the base 6. The part of the fastener 14 on the right in FIG. 2 is then engaged from above by the web 12 and the tongue 13. This unit composed of the fastener 14 and base 6 can now be pivoted and moved until stopped by the positioning catch 20. This results in a position in which the bolt 16, over which the supporting dome 15 is now shoved, can now be screwed into the thread 17 without trouble. Since the threaded bolt 16 is supported by a shoulder 22 on the supporting dome 15, and the supporting dome 15 tightly engages the second opening 5 of the floor plate 3, the left part of the fastener 14 is pulled against the inside of the floor plate 3. At the same time, the right part of the fastener 14 pivots up, thereby pressing the base 6 against the bottom of the sustaining body 1.

The bottom of the supporting dome 15 is supported on the floor 23 of a roof channel. If there is no roof channel, the supporting dome 15 must be replaced by a compensating element (not illustrated) to be tightly inserted into the opening 5. The bottom open end of the threaded bolt 16 goes through a boring in the roof construction, not illustrated, such as hoop or bow or the like, and receives a threaded nut which fastens the sustainer to the vehicle's roof 7.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A sustainer for a roof rail which can be placed on a roof surface of said vehicle to assist in securing said roof rail to said roof surface, wherein said roof surface includes a member for assisting in securing said sustainer to said roof surface, said sustainer comprising:

a hollow sustaining body adapted to be secured to an end portion of said roof rail;

said hollow sustaining body having a floor plate, said floor plate having first and second spaced apart openings formed therein;

a fastener having a first portion adapted to extend through said first opening in said floor plate and a second portion adapted to overlie said second opening, said second portion having an aperture associated therewith; and a screw-like element adapted to extend through said member and to engage said aperture when said aperture is generally aligned over said second opening in said hollow sustaining body, to thereby draw said fastener toward said roof surface to cause said floor plate of said hollow sustaining body to be drawn toward said roof surface such that said hollow sustaining body is clamped to said roof surface.

2. The sustainer of claim 1, wherein said fastener comprises of a sheet metal strip having a step-shaped offset approximately as thick as said floor plate.

3. The sustainer of claim 2, wherein said step-shaped offset is disposed at an approximate mid-point along a length of said fastener, and wherein said aperture comprises a threaded aperture.

4. The sustainer of claim 1, wherein said aperture is formed directly in said second portion and comprises a threaded aperture.

5. The sustainer of claim 1, wherein said aperture is formed in a nut fixedly secured to said second portion of said fastener.

6. The sustainer of claim 1, wherein said first portion comprises a stepped portion.

7. The sustainer of claim 1, further comprising a base portion having first and second openings spaced apart in accordance with the spacing of said openings in said floor plate, said base portion being adapted to be interposed between said floor plate and said roof surface such that said sustaining body does not rest directly against said roof surface.

8. The sustainer of claim 1, wherein said fastener comprises a positioning catch for assisting in locating said fastener relative to said floor plate.

9. The sustainer of claim 1, wherein said fastener further comprises a bent material tab.

10. The sustainer of claim 2, wherein said first opening in said base comprises an oblong recess which has a width at least equal to the width of said fastener, and wherein said oblong recess is bridged by a web at a first longitudinal end and includes a free punched, doubly bent tongue at its second longitudinal end that said first portion of said fastener can engage during assembly of sustainer to said roof surface.

11. The sustainer of claim 2, wherein said base is comprised of rubber or plastic.

12. The sustainer of claim 2, wherein said base has a surrounding collar for nestably receiving a portion of said sustaining body.

13. A sustainer for a roof rail which can be placed on a roof surface of said vehicle to assist in securing said roof rail to said roof surface, wherein said roof surface includes a member for assisting in securing said sustainer to said roof surface, said sustainer comprising:

a hollow sustaining body adapted to be secured to an end portion of said roof rail;

said hollow sustaining body having a floor plate, said floor plate having first and second spaced apart openings formed therein;

a base portion having first and second spaced apart openings spaced in accordance with the spacing of said openings in said hollow sustaining body, said base portion being adapted to be interposed between said roof surface and said sustaining body during assembly of said sustainer to prevent direct contact of said sustaining body with said roof surface;

a fastener having a first portion adapted to extend through said first opening in said floor plate and said first opening in said base, and a second portion adapted to overlie said second opening in said floor plate, said second portion of said fastener having an aperture associated therewith;

a screw-like element adapted to extend through said member and to engage said aperture when said aperture is generally aligned over said second opening in said hollow sustaining body, to thereby draw said fastener toward said roof surface to cause said floor plate of said hollow sustaining body to be drawn toward said roof surface such that said hollow sustaining body is clamped to said roof surface.

14. The sustainer of claim 13, wherein said fastener comprises a single piece component manufactured from a sheet metal strip, and wherein said fastener further comprises a step-shaped offset approximately as thick as said floor plate and formed at an approximate mid-point along the length of said fastener.

15. The sustainer of claim 14, wherein said aperture is formed directly in said second portion of said fastener.

16. The sustainer of claim 14, wherein said aperture is formed in a nut which is fixedly secured to said second portion of said fastener.

17. The sustainer of claim 14, wherein said fastener has a free punched positioning catch disposed adjacent said second portion thereof to assist in locating said fastener relative to said floor plate.

18. The sustainer of claim 14, wherein said base comprises a rubber component.

19. A sustainer for a roof rail which can be placed on a roof surface of said vehicle to assist in securing said roof rail to said roof surface, wherein said roof surface includes a member for assisting in securing said sustainer to said roof surface, said sustainer comprising:

a hollow sustaining body adapted to be secured to an end portion of said roof rail;

said hollow sustaining body having a floor plate, said floor plate having first and second spaced apart openings formed therein;

a base portion having first and second spaced apart openings spaced in accordance with the spacing of said openings in said hollow sustaining body, said base portion being adapted to be interposed between said roof surface and said sustaining body during assembly of said sustainer to prevent direct contact of said sustaining body with said roof surface, one end of said base having a free punched, doubly bent tongue;

a fastener having a first portion adapted to extend through said first opening in said floor plate and said first opening in said base, and a second portion adapted to overlie said second opening in said floor plate, said second portion of said fastener having an aperture associated therewith;

a screw-like element adapted to extend through said member and to engage said aperture when said aperture is generally aligned over said second opening in said hollow sustaining body, to thereby draw said fastener toward said roof surface to cause said floor plate of said hollow sustaining body to be drawn toward said roof surface such that said hollow sustaining body is clamped to said roof surface; and said first portion having an outermost end adapted to engage with said doubly bent tongue of said base to prevent said fastener from rocking as said screw-like element is tightened relative to said fastener.

* * * * *

UNITED STATES PATENT AND TRADEMARK OFFICE
CERTIFICATE OF CORRECTION

PATENT NO. : 6,089,427
DATED : July 18, 2000
INVENTOR(S) : Brigette Evels

Page 1 of 1

It is certified that error appears in the above-identified patent and that said Letters Patent is hereby corrected as shown below:

Column 1,
Line 7, after "BACKGROUND" insert -- AND SUMMARY --
Line 14, after "has" insert -- a --

Column 2,
Line 48, after "FIG. 1" insert -- is --
Line 51, after "FIG. 2" insert -- is --
Line 53, after "FIG. 3" insert -- is --
Line 59, after "sustaining body" insert -- 1 --

Column 5, claim 17,
Line 29, "claim 14" should be -- claim 13 --

Column 5, claim 18,
Line 34, "claim 14" should be -- claim 13 --

Signed and Sealed this

Twelfth Day of February, 2002

Attest:

JAMES E. ROGAN
*Attesting Officer*  *Director of the United States Patent and Trademark Office*